United States Patent [19]

Boger et al.

[11] 4,076,837
[45] Feb. 28, 1978

[54] PESTICIDAL FORMAMIDINE COMPOUNDS

[75] Inventors: Manfred Boger, Weil am Rhine, Germany; Jozef Drabek, Allschwil, Switzerland

[73] Assignee: Ciba-Geigy Corporation, Ardsley, N.Y.

[21] Appl. No.: 740,899

[22] Filed: Nov. 11, 1976

[30] Foreign Application Priority Data

Nov. 20, 1975  Switzerland ........................ 15032/75
Oct. 21, 1976  Switzerland ........................ 13308/76

[51] Int. Cl.$^2$ ........................ A01N 9/20; C07C 121/52
[52] U.S. Cl. ........................ 424/304; 260/465 E
[58] Field of Search ........................ 424/304; 260/46 TE

[56] References Cited

U.S. PATENT DOCUMENTS 3,887,619  6/1975  Rizzo ........................ 260/564 RF Primary Examiner—Leonard Schenkman
Attorney, Agent, or Firm—Harry Falber

[57] ABSTRACT

Compounds of the formula I

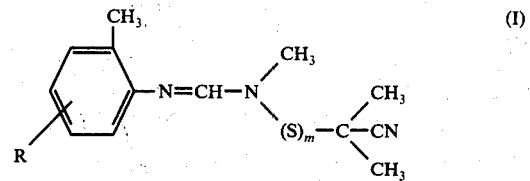

wherein R represents methyl or chlorine in the 4- or 6-position and $m$ is 1 or 2 posess valuable pesticidal, in particular insecticidal and acaricidal properties.

9 Claims, No Drawings

PESTICIDAL FORMAMIDINE COMPOUNDS

The present invention provides novel N-phenyl-N'-methyl-N'-isobutyronitrile- mono- and -disulphide-formamidines which possess pesticidal activity, a process for the manufacture thereof, pesticidal compositions which contain these formamidines as active component and a method of controlling pests which comprises the use of the novel compounds.

The N-phenylformamidines of this invention have the formula I

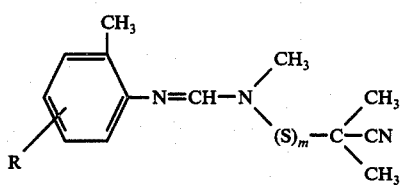

wherein R represents a chlorine atom or a methyl group in the 4- or 6-position, and $m$ is 1 or 2.

The compounds of the formula I, which are themselves novel, can be obtained by methods known per se, for example by reacting a compound of the formula II

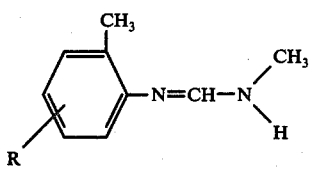

wherein R is as defined in formula I, with a compound of the formula III

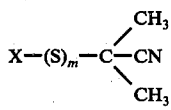

wherein $m$ is as defined in formula I and X represents a halogen atom, in particular a chlorine or bromine atom, the reaction being carried out in the presence of a base.

Examples of bases which are suitable for this process are tertiary amines, such as triethylamine, dimethyl aniline, pyridine, picolines and lutidines.

The process is advantageously carried out at a reaction temperature of −20° to +30° C, preferably of 0° to 10° C, at normal pressure and in solvents or diluents. Examples of suitable solvents or diluents are: ethers and ethereal compounds, such as diethyl ether, dipropyl ether, dioxan, dimethoxy ethane and tetrahydrofurane; amides, such as N,N-dialkylated carboxamides; aliphatic, aromatic and halogenated hydrocarbons, in particular benzene, toluene, xylenes, chloroform and chlorobenzene; nitriles, such as acetonitrile; dimethyl sulphate; ketones, such as acetone and methyl ethyl ketone, and water.

The starting materials of the formulae II and III are known and can be prepareed by methods analogous to known ones. Thus, for example, a process for obtaining compounds of the formula III is described in U.S. Pat. No. 3,832,378.

The compounds of the present invention are suitable for controlling a variety of pests, chiefly insects and representatives of the order Acarina, which cause damage to plants and animals. Thus these substances have a lethal action on eggs, larvae, nymphs, pupae and adults of insects of the families: Tettigoniidae, Gryllidae, Gryllotalpidae, Blattidae, Reduviidae, Pyrrhocoridae, Cimicidae, Delphacidae, Aphididae, Diaspididae, Pseudococcidae, Scarabaeidae, Dermestidae, Coccinellidae, Tenebrionidae, Chrysomelidae, Bruchidae, Tineidae, Noctuidae, Lymantriidae, Pyralidae, Culicidae, Tipulidae, Stomoxydae, Trypetidae, Muscidae, Calliphoridae and Pulicidae as well as Acarina of the families Ixodidae, Argasidae, Tetranychidae und Dermanyssidae.

The compounds of the formula I have in particular a very good systemic action against aphids, for example Aphis fabae, and an advantageous stomach poison and contact action against insects that damage rice, such as Chilo suppressalis larvae. Accordingly, they are particularly suitable for controlling harmful insects in crops of vegetables, fruit and rice plantations and in ornamental plants.

In addition, the active substances of the formula I have useful action against ectoparasites, for example Lucilia sericata and ticks, and they can be used for example for external application to productive livestock or for treating their environment.

The insecticidal and/or acaricidal action can be substantially broadened and adapted to given circumstances by addition of other insecticides and/or acaricides. Examples of suitable additives include: organic phoshorus compounds, nitrophenols and derivatives thereof, formamidines, ureas, pyethroids, ureas, carbamates, and chlorinated hydrocarbons.

The compounds of the formula I may be used as pure active substance or together with suitable carriers and/or additives. Suitable carriers and additives can be solid or liquid and correspond to the substances conventionally used in the art of formulation, for example natural or regenerated substances, solvents, dispersants, wetting agents, tackifiers, thickeners, binders and/or fertilisers.

For application, the compounds of the formula I may be processed to dusts, emulsion concentrates, granules, dispersions, sprays, to solutions, or suspensions, in the conventional formulation which is commonly employed in application technology. In addition, cattle dips and spray races, in which aqueous preparations are used, may also be mentioned.

The compositions according to the invention are manufactured in known manner by homogeneously mixing and/or grinding active substances of the formula I with the suitable carriers, with or without the addition of dispersants or solvents which are inert to the active substances.

The active substances may take, and be used in, the following forms:

Solid forms:

Dusts, tracking agents and granules (coated granules, impregnated granules and homogeneous granules).

Liquid forms:

a. active substances which are dispersible in water: wettable powders, pastes and emulsions;
b. solutions.

The content of active substance in the above described compositions is between 0.1% and 95%.

The active substances of the formula I can, for example, be formulated as follows (throughout the present specification all parts and percentages are by weight):

Dusts

The following substances are used to manufacture a) a 5% and b) a 2% dust:

| a) | 5 parts of active substance, |
| | 95 parts of talc; |
| b) | 2 parts of active substance, |
| | 1 part of highly disperse silicic acid, |
| | 97 parts of talc. |

The active substances are mixed with the carriers and ground.

Granules

The following substances are used to product 5% granules:

| 5 | parts of active substance, |
| 0.25 | parts of epichlorohydrin, |
| 0.25 | parts of cetyl polyglycol ether, |
| 3.50 | parts of polyethylene glycol, |
| 91 | parts of kaolin (particle size 0.3 - 0.8 mm). |

The active substance is mixed with epichlorohydrin and dissolved with 6 parts of acetone; the polyethylene glycol and cetyl polyglycol ether are then added. The resultant solution is sprayed on kaolin, and the acetone is subsequently evaporated in vacuo.

Wettable powder:

The following constituents are used for the preparation of a) a 40%, b) and c) a 25%, and d) a 10% wettable powder:

| a) | 40 | parts of active substance, |
| | 5 | parts of sodium lignin sulphonate, |
| | 1 | part of sodium dibutyl-naphthalene sulphonate, |
| | 54 | parts of silicic acid, |
| b) | 25 | parts of active substance, |
| | 4.5 | parts of calcium lignin sulphonate, |
| | 1.9 | parts of Champagne chalk/hydroxyethyl cellulose mixture (1:1), |
| | 1.5 | parts of sodium dibutyl naphthalene sulphonate, |
| | 19.5 | parts of silicic acid, |
| | 19.5 | parts of Champagne chalk, |
| | 28.1 | parts of kaolin, |
| c) | 25 | parts of active substance, |
| | 2.5 | parts of isooctylphenoxy-polyoxyethylene-ethanol, |
| | 1.7 | parts of Champagne chalk/hydroxyethyl cellulose mixture (1:1), |
| | 8.3 | parts of sodium aluminium silicate, |
| | 16.5 | parts of kieselguhr, |
| | 46 | parts of kaolin, |
| d) | 10 | parts of active substance, |
| | 3 | parts of a mixture of the sodium salts of saturated fatty alcohol sulphates, |
| | 5 | parts of naphthalenesulphonic acid/formaldehyde condensate, |
| | 82 | parts of kaolin. |

The active substances are homogeneously mixed, in suitable mixers, with the additives, the mixture being then ground in the appropriate mills and rollers. Wettable powders are obtained which can be diluted with water to give suspensions of the desired concentration.

Emulsifiable concentrates:

The following substances are used to produce a) a 10%, b) a 25%, and c) a 50% emulsifiable concentrate:

| a) | 10 | parts of active substance, |
| | 3.4 | parts of epoxidised vegetable oil, |
| | 3.4 | parts of a combination emulsifier consisting of fatty alcohol polyglycol ether and alkylarylsulphonate calcium salt, |
| | 40 | parts of dimethyl formamide, |
| | 43.2 | parts of xylene; |
| b) | 25 | parts of active substance, |
| | 2.5 | parts of epoxidised vegetable oil, |
| | 10 | parts of alkylarylsulphonate/fatty alcohol polyglycol ether mixture, |
| | 5 | parts of dimethyl formamide, |
| | 57.5 | parts of xylene; |
| c) | 50 | parts of active substance, |
| | 4.2 | parts of tributylphenol-polyglycol ether, |
| | 5.8 | parts of calcium-dodecylbenzenesulphonate, |
| | 20 | parts of cyclohexanone, |
| | 20 | parts of xylene. |

By diluting these concentrates with water it is possible to obtain emulsions of the required concentration.

Spray:

The following ingredients are used to prepare a) a 5% spray, and b) a 95% spray:

| a) | 5 parts of active substance, |
| | 1 part of epichlorohydrin, |
| | 94 parts of ligroin (boiling range 160° -190° C); |
| b) | 95 parts of active substance, |
| | 5 parts of epichlorohydrin. |

The invention is further illustrated by the following Examples.

EXAMPLE 1

Preparation of N-(2,4-dimethylphenyl)-N'-methyl-N'-isobutyronitrile-disulphide-formamidine While stirring constantly and cooling at 0° to 10° C, 13.4 g of α-(chlorodithio)-isobutyronitrile were added dropwise to a solution of 13 g of N-(2,4-dimethylphenyl)-N'-methylformamidine and 8.1 g of triethylamine in 120 ml of methylene chloride. The reaction mixture was thereafter stirred for half an hour at room temperature and 100 ml of water were added thereto. The organic phase, which had been previousy dried over sodium sulphate, was concentrated under a high vacuum to yield the compound of the formula

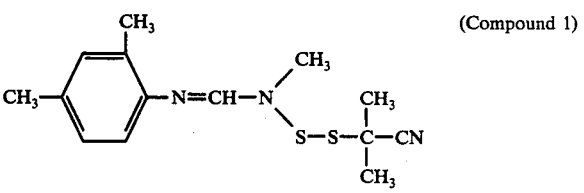

(Compound 1)

in the form of a yellow oil with a refractive index of $n_D^{20} = 1.5856$. The following compounds of the formula I'

$$R_1 \text{—} \underset{R_2}{\underset{|}{\overset{\overset{CH_3}{|}}{\text{benzene}}}} \text{—} N=CH-N\underset{(S)_m-\overset{CH_3}{\underset{CH_3}{\overset{|}{C}}}-CN}{\overset{CH_3}{\diagup}} \quad (I')$$

can be manufactured in analogous manner:

| Compound | $R_1$ | $R_2$ | m | Physical data |
|---|---|---|---|---|
| 2 | Cl | H | 2 | $n_D^{20} = 1{,}5999$ |
| 3 | H | CH$_3$ | 2 | m.p. 53 – 55° C |
| 4 | H | Cl | 2 | m.p. 71 – 72° C |
| 5 | CH$_3$ | H | 1 | $n_D^{20} = 1{,}5605$ |
| 6 | Cl | H | 1 | $n_D^{20} = 1{,}5756$ |
| 7 | H | CH$_3$ | 1 | $n_D^{20} = 1{,}5542$ |
| 8 | H | Cl | 1 | $n_D^{20} = 1{,}5662$ |

EXAMPLE 2

Systemic action against Aphis fabae

Bean plants which had grown roots were transplanted into pots containing 600 ccm of soil and then 50 ml of a solution containing 50 ppm, 10 ppm or 1 ppm of the compound to be tested (obtained from a 25% wettable powder) were poured directly onto the soil.

After 24 hours the parts of the plants above the soil were populated with aphids (*Aphis fabae*) and a plastic cylinder was then slipped over the plants to protect the aphids from any possible contact with the test substance either directly or via the gas phase.

The evaluation of mortality was made 48 and 72 hours respectively after the start of the test. Two plants, each in a separate pot, were used per concentration of test substance. The test was carried out at 25° C and 70% relative humidity.

In this test, the compounds of example 1 exhibited a positive systemic action against *Aphis fabae*. Compound 2 is to be singled out on account of its particularly good action.

EXAMPLE 3

Action against Chilo suppressalis

Rice seedlings of the variety Caloro were reared in plastic pots (6 seedlings per pot) so that their roots became matted to a disc. The roots were then immersed in a 0.08% solution of active substance and allowed to drip off. Then each pot was polulated with 5 Chilo suppressalis larvae in the L$_2$-stage and the treated plants were subsequently replaced in the pots on top of the larvae.

Evaluation of mortality was made after 5 days and the test was carried out at 24° C and 70% relative humidity. Compounds 1, 2 and 5 of Example 1 acted well in this test against Chilo suppressalis larvae.

EXAMPLE 4

Action against Lucilia sericata

An aqueous solution (2 ml) containing 0.1% of test compound was added to 2 ml of a culture medium and then approx. 30 freshly hatched out larvae of the species Lucilia sericata were added to the treated culture medium. The mortality rate was evaluated 96 hours later.

Compounds of Example 1 exhibited in this test a positive action against Lucilia sericata larvae.

EXAMPLE 5

Action against adults and larvae of the species Tetranychus urticae (OP-sensitive) and Tetranychus cinnabarius (OP-resistant)

The primary leaves of *Phaseolus vulgaris* plants were infected with an infested piece of leaf from a mass culture of *Tetranychus urticae* (OP-sensitive) and/or *Tetranychus cinnabarius* (OP-resistant) 16 hours before the test for acaricidal action. (The resistance refers to the tolerance to diazinone). The mobile stages which had migrated to the plants were sprayed from a chromatographic atomiser with an emulsified test preparation containing 400 ppm of active substance. The number of living and dead adults and larvae (all mobile stages) was evaluated under a stereoscopic microscope after 24 hours and again after 7 days.

One plant was used per test substance and per test species. During the test run, the plants stood in greenhouse compartments at 25° C.

In this test, the compounds of Example 1 acted against adults and larvae of the species *Tetranychus urticae* and *Tetranuchus cinnabarius*. Compounds 2 and 5 were particularly effective.

EXAMPLE 6

Action against eggs of the species Tetranychus urticae (OP-resistant)

Female (♀♀) adults of the species Tetranychus urticae were transferred to *Phaseolus vulgaris* plants in the two-leaf stage and left thereon for 24 hours for oviposition. The adults were then removed and the eggs sprayed after a further 24 hours with a test solution containing 100 ppm of the compound to be tested.

The number of dead (unhatched) eggs was determined 6 days after the plants had been treated with the test solution. During the run of the test, the plants stood in greenhouse compartments at 25° C.

In this test, the compounds of Example 1 acted well against eggs of the spcies Tetranychus urticae. Compounds 1, 2 and 5 are to be singled out on account of their particularly good action.

EXAMPLE 7

Action against Rhipicephalus bursa and Boophilus microplus (OP-sensitive and OP-resistant)

Five adults or approx. 50 larvae of the species Rhipicephalus bursa, or 20 OP-sensitive or 20 OP-resistant larvae of the species Boophilus microplus, were counted into each of a number of test tubes and immersed for 1 to 2 minutes in 2 ml of an aqueous emulsion containing 100, 10, 1 and 0.1 ppm of test substance. Each test tube was then sealed with a cotton wool plug and placed on its head to enable the cotton wool to absorb excess active substance emulsion.

The mortality rate of the adults was evaluated after 2 weeks and that of the larvae of both species after 2 days. Each test was repeated twice (development stage or tolerance/species/active substance concentration).

In these tests, the compounds of Example 1 acted against adults and larvae of *Rhipicephalus bursa* and on OP-sensitive and OP-resistant larvae of *Boophilus microplus*.

We claim:
1. A compound of the formula I

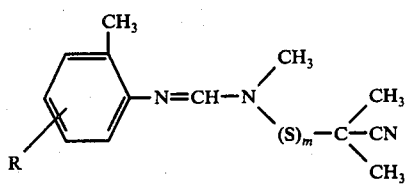
(I)

wherein R represents chlorine or methyl in the 4- or 6-position and m represents 1 or 2.

2. A compound according to claim 1 of the formula

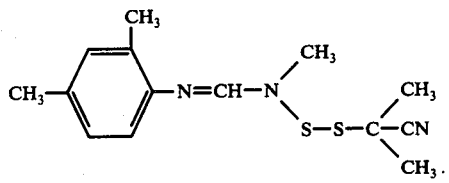

3. A compound according to claim 1 of the formula

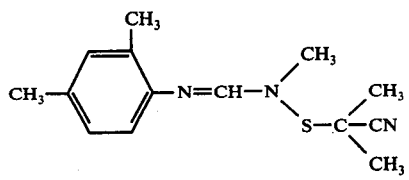

4. A compound according to claim 1 of the formula

5. A compound according to claim 1 of the formula

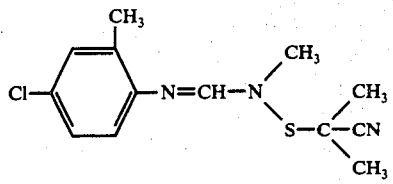

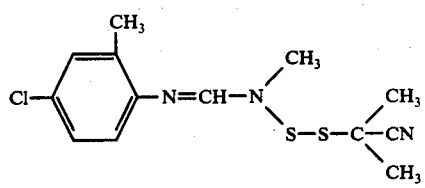

6. An insecticidal and acaricidal composition which comprises an insecticidally and acaricidally effective amount of a compound of claim 1, together with a suitable carrier therefor.

7. A method of combating pests of the class Insecta or of the order Acarina at a locus, which method comprises applying to the locus an effective amount of a compound of the formula I as defined in claim 1.

8. A method according to claim 7 wherein the locus comprises growing agricultural or horticultural crops, produce or commercially reared livestock or the environment thereof.

9. A method according to claim 8 wherein the locus comprises vegetable, fruit and rice cultures and cultures of ornamental plants.

* * * * *